US008770474B2

(12) United States Patent
Claghorn et al.

(10) Patent No.: US 8,770,474 B2

(45) Date of Patent: Jul. 8, 2014

(54) BILL ACCEPTOR WITH IMPROVED BEZEL

(75) Inventors: Roger Claghorn, Ellisville, MO (US); Thomas S. Paczkowski, Grover, MO (US); Mark Leibu, St. Louis, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 0 days.

(21) Appl. No.: 12/399,637

(22) Filed: Mar. 6, 2009

(65) Prior Publication Data

US 2009/0228139 A1 Sep. 10, 2009

Related U.S. Application Data

(60) Provisional application No. 61/034,482, filed on Mar. 6, 2008.

(51) Int. Cl.

*G06Q 40/00* (2012.01)
*G07D 11/00* (2006.01)
*G07F 7/04* (2006.01)

(52) U.S. Cl.

CPC .............. *G07D 11/0048* (2013.01); *G07F 7/04* (2013.01)
USPC ........................................... 235/379; 235/381

(58) Field of Classification Search

USPC ................... 235/379, 381; 194/348, 217, 206
See application file for complete search history.

(56) References Cited

U.S. PATENT DOCUMENTS

| | | | | |
|---|---|---|---|---|
| 4,499,982 | A * | 2/1985 | Sugimoto et al. | 194/217 |
| 6,994,202 | B1 * | 2/2006 | Billington et al. | 194/217 |
| 7,335,903 | B1 * | 2/2008 | Yang et al. | 250/566 |
| 2004/0249501 | A1 * | 12/2004 | Hand et al. | 700/231 |

* cited by examiner

*Primary Examiner* — Michael G Lee
*Assistant Examiner* — Tabitha Chedekel
(74) *Attorney, Agent, or Firm* — Polster Lieder

(57) ABSTRACT

A bill validator for a vending machine including a bill validator housing having a pair of wing deflectors associated therewith in a sliding arrangement and a bezel having at least two indicator apertures in a faceplate portion thereof and further comprising a pair of opposing mounting wings, the mounting wings comprising retainer portions, the retainer portions comprising ramped surfaces and retainer surfaces on inner surfaces of the wings. The retainer portions cooperate with bezel mount apertures formed in the bill validator housing to retain the bezel upon the bill validator housing. The wing deflectors comprise tapered surfaces at an end adjacent to the mounting wings, the tapered surfaces when brought into contact with the mounting wings resiliently force the mounting wings outwardly to disengage the retainer portions from the bezel mount apertures to allow disassociation of the bezel from the bill validator housing.

18 Claims, 12 Drawing Sheets

ASSEMBLED VIEW

EXPLODED VIEW

FACEMASK ATTACHED

FACEMASK REMOVED (LED'S EXPOSED)

LED'S #1 AND #2 - LIGHT UP ONE-DOLLAR INDICTOR
LED'S #4 AND #5 - LIGHT UP FIVE-DOLLAR INDICATOR

| Menu Options | |
|---|---|
| **Display** | **Description** |
| d1 | **Dispense one bill** from recycler (operational test function) |
| AF | **Auto Fill** mode allows preloading recycler without establishing credit (service mode). |
| CL | **Changer Lockout** limits coins as change until recycler bill count achieved (prevents coin starvation). |

BILL ACCEPTOR WITH IMPROVED BEZEL

CROSS-REFERENCE TO RELATED APPLICATIONS

The present application claims priority to Provisional Application Ser. No. 61/034,482, filed on Mar. 6, 2008. The contents of this application are incorporated herein by reference.

FIELD OF THE INVENTION

This invention relates generally to a bill validator and bezel attachment to a vending machine and in particular to an attachment in which the bezel is fixedly attached to a vending machine and the bill validator includes a quick release mechanism for rapid installation and removal of the bill validator for service.

Furthermore, the invention relates to a bill validator equipped with two boxes, a stacker box and a stacker-dispenser box.

Furthermore the invention relates to a vending machine equipped with at least a bill validator and a coin changer capable to accept money from a customer willing to establish a credit in within the vending machine for the purpose of buying a product located in the vending machine. Furthermore, the coin changer is equipped with tubes capable to store and payout coins of specific denominations. Furthermore, the bill validator is equipped with a stacker box where bills of different denominations could be stored and a stacker-dispenser box from which bills of at least one denomination could be paid out to the customer.

Furthermore, the invention relates to a vending machine equipped with a central vending machine controller capable to communicate with money accepting devices like a bill validator or a coin changer, etc.

Furthermore, the invention relates to a bill validator and bezel attachment where the bezel is equipped with a display capable of communicating instructions to the customer.

Furthermore, the invention relates to a vending machine equipped with a vending machine controller and devices to accept money like a bill validator with two bill storage boxes and a coin changer with coin tubes where the number or amount of coins in the coin tubes and the number or amount of bills in the stacker-dispenser box determines what bill denominations and coin denominations are acceptable to be used for credit.

Furthermore, the invention relates to a vending machine equipped with a vending machine controller and devices to accept money like a bill validator with two boxes and a coin changer with coin tubes where the acceptable bill denominations are displayed on the bill validator bezel display.

Furthermore, the invention relates to said bill validator with two bill storage boxes where the number of stored bills is configurable based on vend price, whereas coins will be preserved and said bill validator bezel communicates to the customer that high denomination bills are disabled until a configured bill count is achieved.

BACKGROUND OF THE INVENTION

In the prior art, bill validator and bezels were preassembled to one another and bill validators, with the bezel attached, were removed and replaced from a vending machine mounting plate having several threaded studs welded thereto by the removal and replacement of several locknuts from the studs. This procedure is time consuming and relatively complicated.

This bill validator and bezel attachment overcomes this problem in a manner not revealed by the known prior art.

In the prior art, vending machines were equipped with devices that take money like bill validator and coin changer. Acceptable denominations of bills and coins were usually determined by the vending machine controller based on the capability of the system to provide change in coins to the customer. The method was good when the average price of a product sold from a vending machine was less than a dollar and the only bill allowed was the $1 bill.

Now, with much higher product prices sold from vending machines, the vending machine operator allow the acceptance of $5 bill denominations. In general this allows for more products to be sold before vending machine service is needed. However, there are situations when a customer uses $5 to buy a low price product and a large amount of change has to be returned. The change is paid using bills from the stacker-dispenser box of the bill validator and/or coins from the tubes in the coin changer. If there are no bills in the stacker-dispenser box, change will be paid from the coins in the coin changer tubes. This will produce coin starvation, which the condition where the coin levels in the coin changer tubes will be greatly reduced or even depleted such that the controller will have to disable the acceptance of any bill and fewer vends can be made before service is required.

Furthermore, bill validators in the vending industry statically communicate the denominations of bills that accepted with information written on decals placed upon the bill acceptor. Therefore, when the controller has determined that it will no longer accept $5 bills due to an inability to make change, this information is not communicated to the consumer and the consumer is left to conclude that the vending machine is not working properly when his $5 bill is rejected. This leads to customer confusion and costly service calls.

The present bill validator and bezel attachment overcomes this problem in a manner not revealed by the known prior art. This proposed bill validator will disable the acceptance of the $5 bill any time the stacker-dispenser box or coin changer is empty and will communicate this to the customer using the display on the bill validator bezel. When there are insufficient bills and/or coins to make the required change, the vending machine controller will display on a vending machine display the “use exact change” message for customer instruction and only coins representing the exact amount of the price will be accepted. At the same time the display on the bill Validator bezel will display the allowed, bills if any, in the “use exact change” condition.

In the prior art, devices inside the vending machine like the vending machine controller, coin changer, bill validator, etc., communicate between themselves in order to accomplish the ultimate goal of delivering a product located inside the vending machine when the customer has established a credit larger than the price of the product he selected. The vending machine controller will control what bills or coins are acceptable so to be able to make the required change in case the credit was larger than the price of the selected product. This method does not resolve the issue of optimizing the total number of vends between service calls for a given amount of change located in the coin changer tubes and bill validator stacker-dispenser box.

Communication of the bill validator and bezel with the coin changer and the vending machine controller overcomes this problem in a manner not revealed by the known prior art. Data showing what bills and coins customers typically uses to make up a credit and what products are usually selected at particular credits are collected over a period of time, stored and analyzed. An optimization algorithm will decide when the acceptance of the $5 bill is a disabled or enabled function of the value and number of bills in the stacker-dispenser and coin tubes

SUMMARY OF THE INVENTION

A bill validator for a vending machine including a bill validator housing having a pair of wing deflectors associated therewith in a sliding arrangement and a bezel having at least two indicator apertures in a faceplate portion thereof and further comprising a pair of opposing mounting wings, the mounting wings comprising retainer portions, the retainer portions comprising ramped surfaces and retainer surfaces on inner surfaces of the wings. The retainer portions cooperate with bezel mount apertures formed in the bill validator housing to retain the bezel upon the bill validator housing. The wing deflectors comprise tapered surfaces at an end adjacent to the mounting wings, the tapered surfaces when brought into contact with the mounting wings resiliently force the mounting wings outwardly to disengage the retainer portions from the bezel mount apertures to allow disassociation of the bezel from the bill validator housing.

DESCRIPTION OF THE PREFERRED EMBODIMENT

Figure 2:
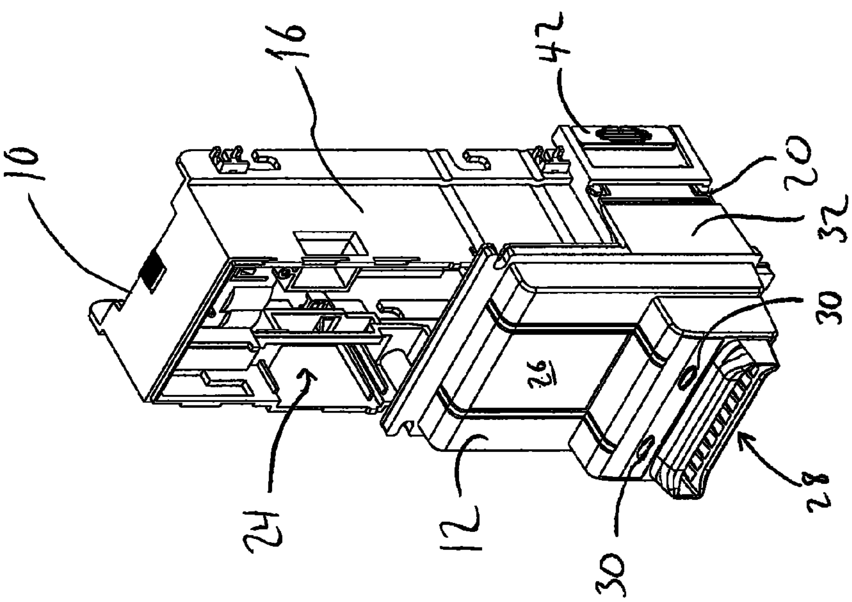
FIG. 2 is a perspective view of a bill validator and bezel according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
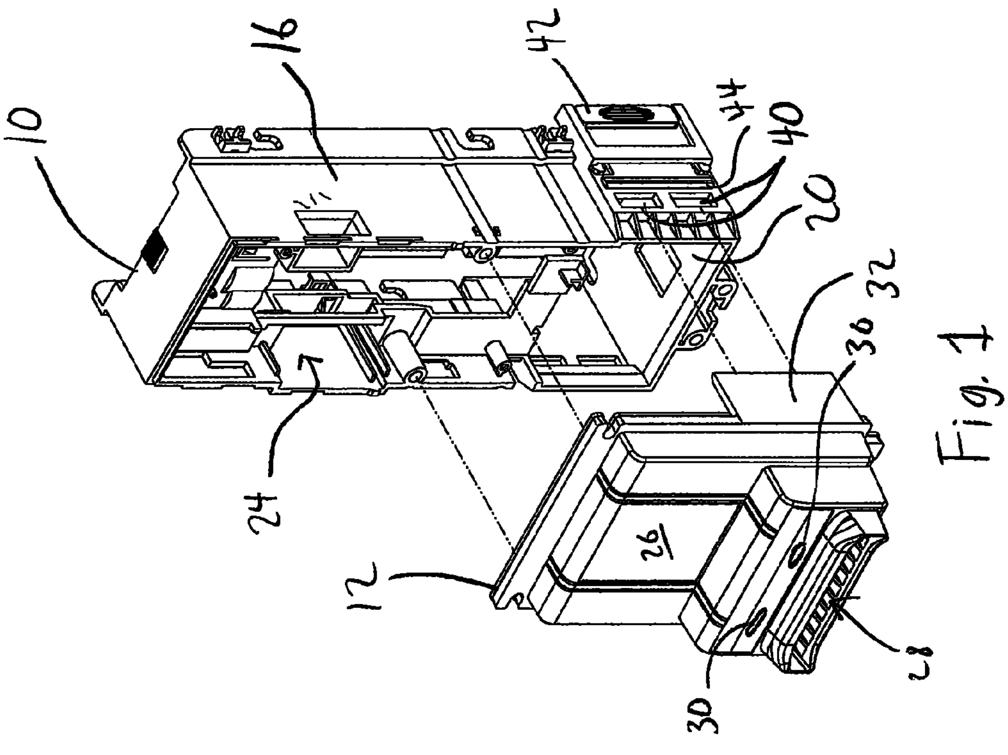
FIG. 1 is a perspective exploded view of a bill validator and bezel according to an embodiment of the present invention.
Figure 4:
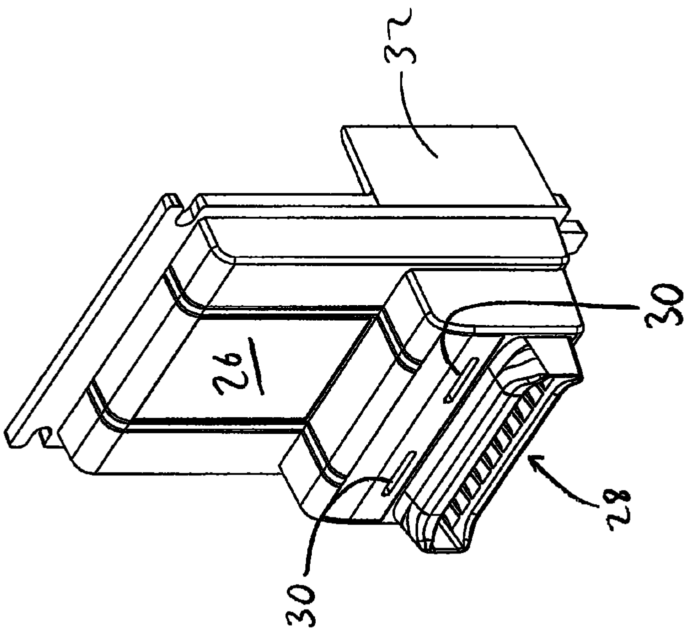
FIG. 4 is a perspective front view of a bezel according to an embodiment of the present invention.
Figure 3:
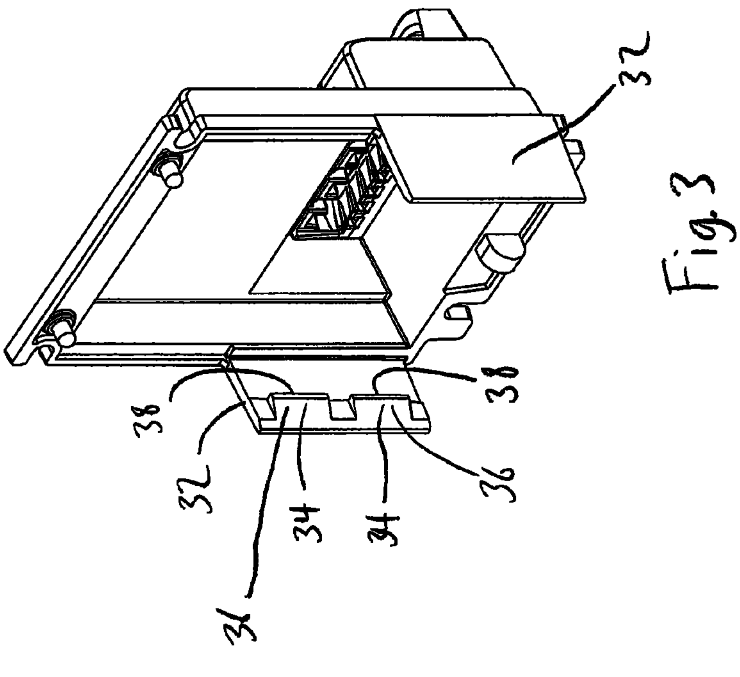
FIG. 3 is a perspective rear view of a bezel according to an embodiment of the present invention.

Referring now by reference numerals to the drawings and first to FIGS. 1 and 2, it will be understood that a bill validator 10 is shown in conjunction with a bezel 12, the bill validator 10 being removably attached to a vending machine (not shown). In the prior art, the bezel 12 is fixedly attached to the bill validator 10 so that when the bill validator is pulled clear of the vending machine for servicing, the bezel 12 is pulled clear with it. In contrast, in the present system, when the bill validator 10 is pulled away from the vending machine, the bezel 12 remains attached to the vending machine. As will appear, there are several advantages in this arrangement which will now be described.

The bill validator 10 includes a body or housing 16 having a cashbox (not shown) attachable thereto and having a lower portion 20 where bills are accepted. It further includes an upper upright portion 24 through which bills are passed en route to said cashbox. An arrangement of this kind is disclosed in U.S. Pat. No. 5,310,173 which is incorporated herein by reference.

Figure 6:
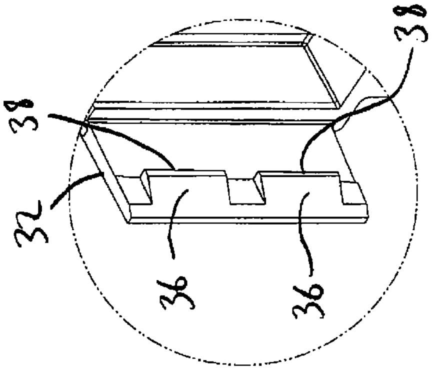
FIG. 6 is an enlarged view of Detail P of FIG. 5.
Figure 8:
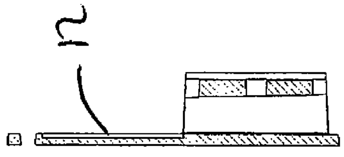
FIG. 8 is a section view taken along line N-N of FIG. 7.
Figure 5:
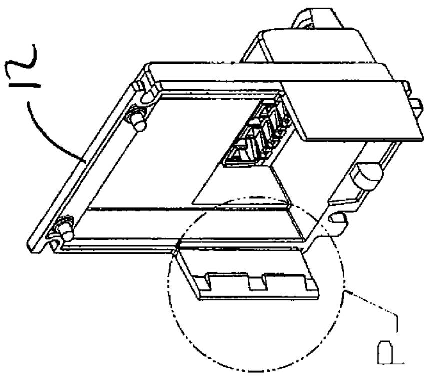
FIG. 5 is a perspective rear view of a bezel according to an embodiment of the present invention.
Figure 7:
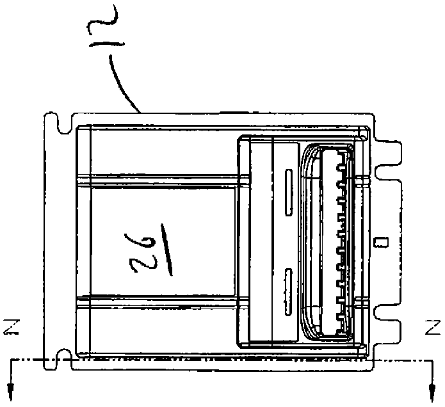
FIG. 7 is a front view of a bezel according to an embodiment of the present invention.
Figure 9:
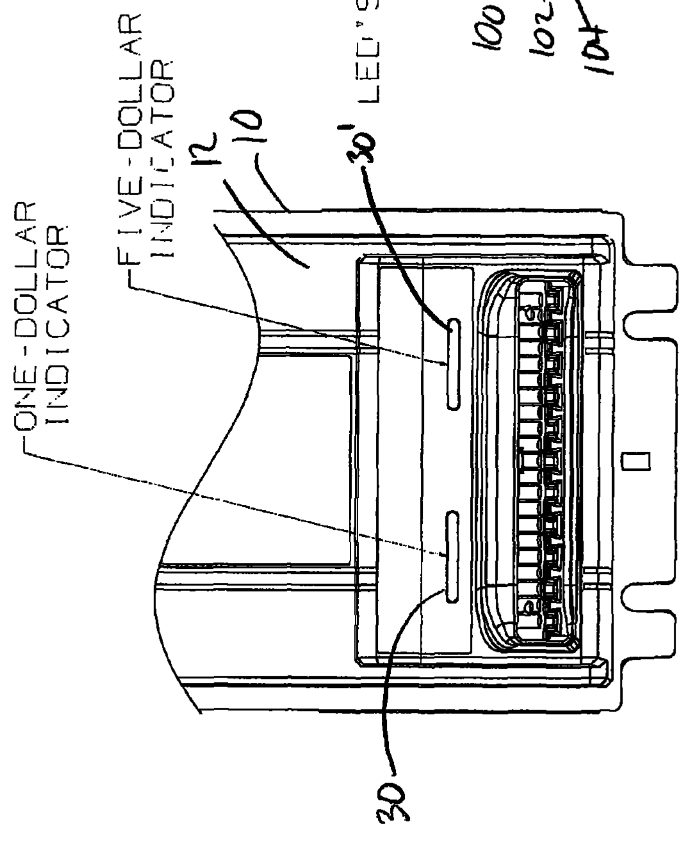
FIG. 9 is a partial front view of a bezel and bill validator according to an embodiment of the present invention.
Figure 10:
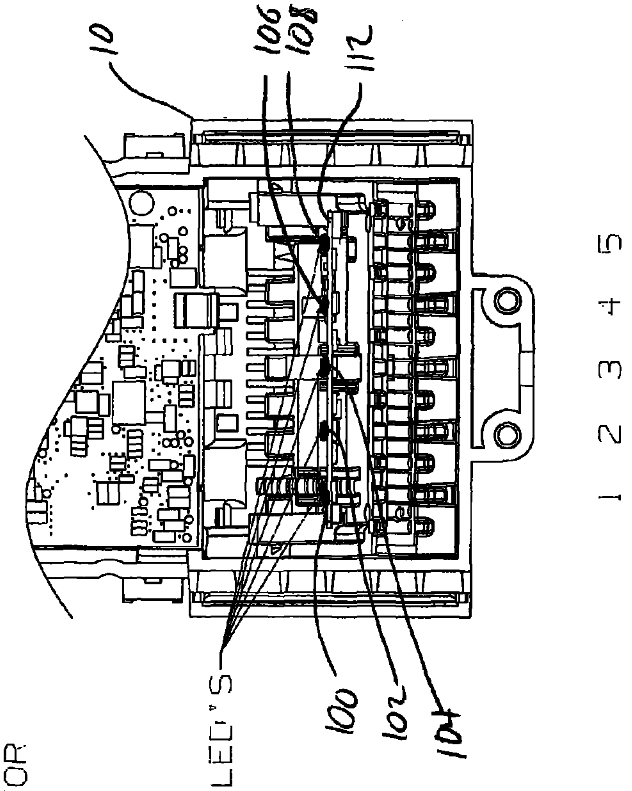
FIG. 10 is a partial front view of a bill validator according to an embodiment of the present invention.
Figure 12:
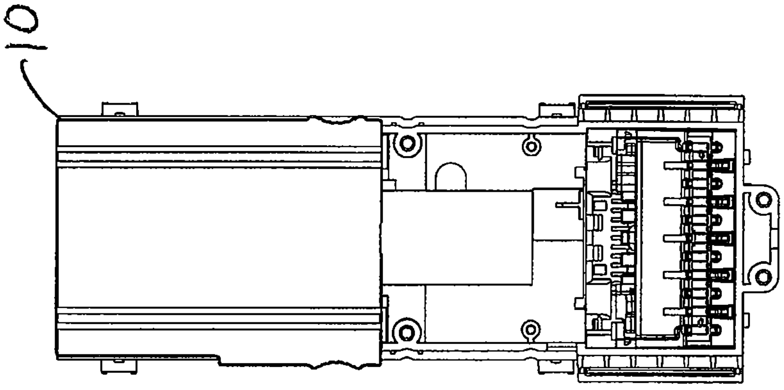
FIG. 12 is a front view of a bill validator according to an embodiment of the present invention.
Figure 11:
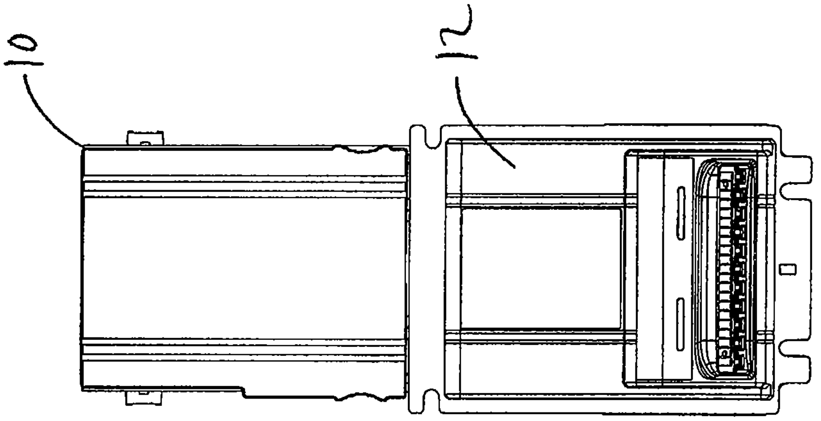
FIG. 11 is a front view of a bezel and bill validator according to an embodiment of the present invention.
Figure 13:
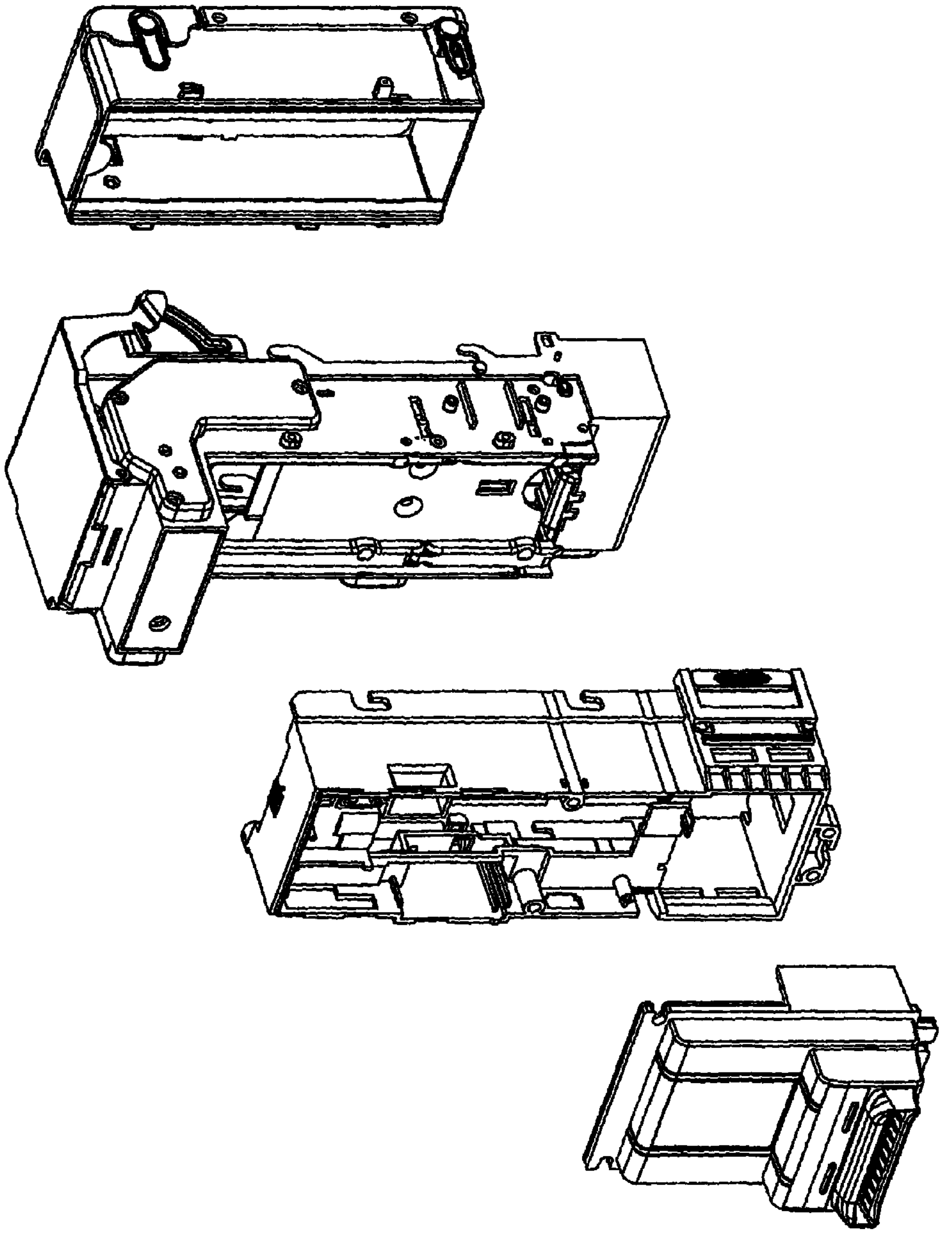
FIG. 13 is a perspective exploded view of a bill Validator, bezel with display, stacker box and stacker-dispenser box according to an embodiment of the present invention.

Referring to FIGS. 1-4, the bezel 12 comprises a faceplate 26 and a bill acceptance projection 28 having an aperture through which bills may be passed to the bill validator 10. The faceplate 26 further comprises a plurality of indicators 30 which may comprise apertures or a translucent material. Furthermore, extending from the bezel 12 are a plurality of mounting wings 32 each comprising retainer portions 34. The retainer portion 34 has a ramped surface 36 and also a retainer surface 38 that is perpendicular to the wings (32 FIGS. 5 and 6).

The bezel 12 is retained on the bill validator 10 by the ramped surfaces 36 of the retainer portions 34 contacting the bill validator 10 and resiliently forcing the wings 32 outwardly from the sides of the bill validator 10 until the ramped surfaces 36 are received within bezel mount apertures 40 of the bill validator 10. When the retainer portions 34 are within the bezel mount apertures 40, the perpendicular retainer surface 38 prevents removal of the bezel 12 from the bill validator 10.

To remove the bezel 12 from the bill validator 10, the bill validator 10 includes a pair of wing deflectors 42, also called mounting flanges, that are moveable forward and rearward with respect to the bill validator 10. The wing deflectors 42 include a tapered surface 44 on a leading edge. When the wing deflectors 42 are moved forwardly toward the bezel 12 (FIG. 2), the tapered surface 44 of the wing deflectors 42 contacts the ramped surface 36 of the wings 32, thereby forcing the wings 32 outwardly to remove the perpendicular retainer surface 38 of the retainer portions 34 from engagement with the bezel mounting apertures 40. In this manner the bezel 12 may be removed from the bill validator 10.

Figure 17:
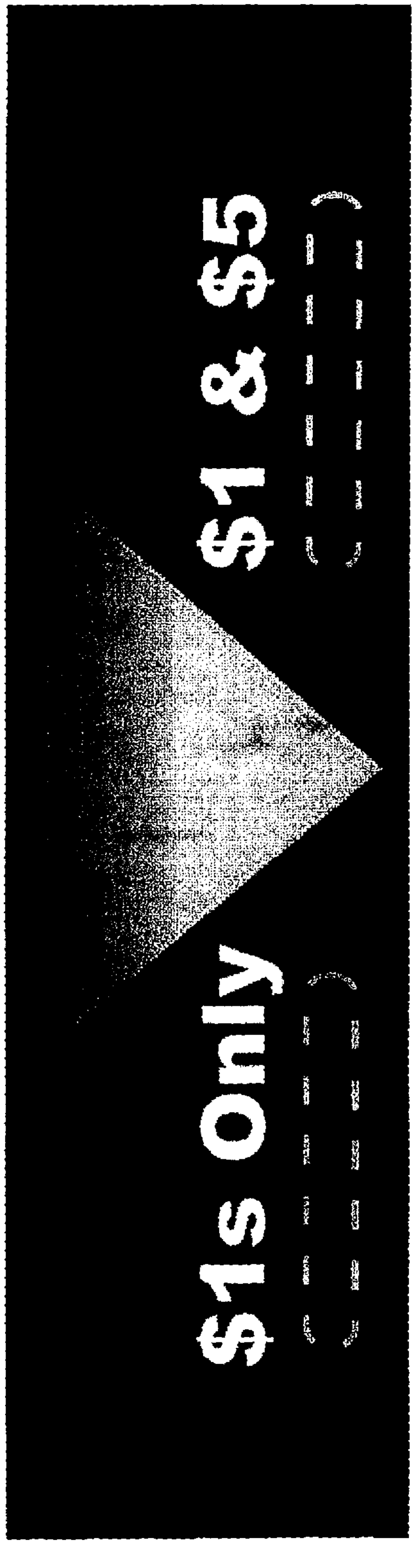
FIG. 17 is a front view of a typical label located on top of the indicators 30 and 30' of the said bill validator bezel according to an embodiment of the present invention.
Figure 18:
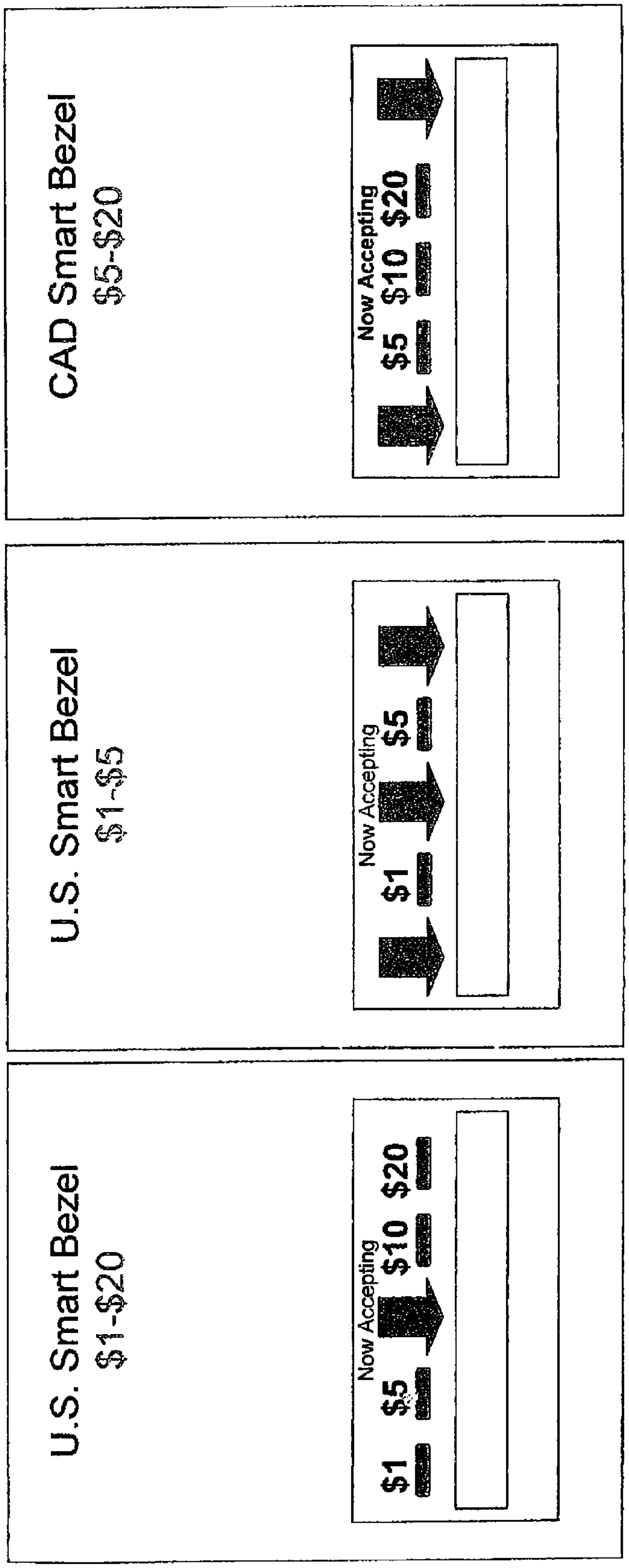
FIG. 18 is a front view of a another typical label located on top of the indicators 30 and 30' of the said bill validator bezel according to an embodiment of the present invention.
Figures 5, 19:
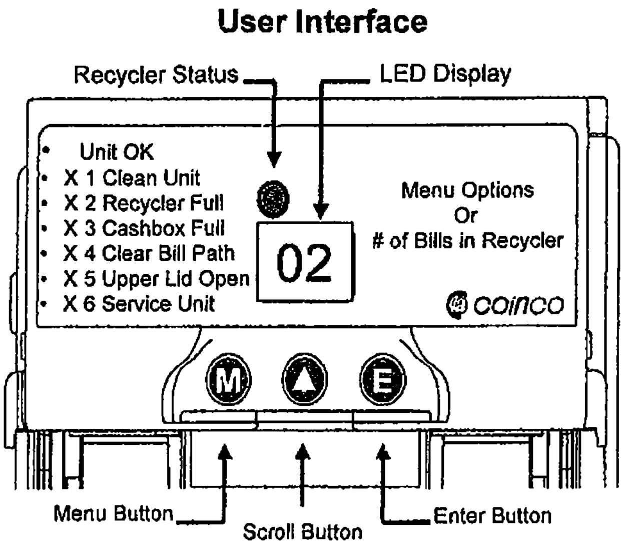
FIG. 19 is a front view of a customer interface located on the back of the said bill validator stacker-dispenser box.

Referring to FIGS. 9-12, the bill validator 10 further comprises a plurality of light emitting diodes (LEDs) 100-108 attached to circuit board 112 located behind the indicators 30 of the bezel 12. Lights are directed toward a front normal plane of the bezel positioned to relate indicators to bill entry slot. It is also contemplated that indicators will have sequential on/off pattern when not used to depict accepted bill denominations. The LEDs 100 and 102, when lit, cause indicator 30 to light to indicate the acceptance of $1 bills. The LEDs 106 and 108, when lit, cause indicator 30' to indicate the acceptance of $5 bills. Alternative indications of the lit apertures is within the understanding of one of ordinary skill in the art, such as one indicator indicating acceptance of $1 and the other indicating acceptance of both $1 and $5 bills. It is contemplated that light pipes may also be used to direct light from the LEDs 100-108 to the indicators 30, 30'. Referring to FIG. 17, it is contemplated that the label depicted in this label will inform the customer on what bills are accepted at any time based on the "$1 only" or "$1& $5" indicator being illuminated by the respective 100 and 102 or 106 and 108 LED's. Referring to FIGS. 9-12 and FIG. 1 again, the bill validator 10 further comprises a plurality of light pipes that will direct the light from the light emitting diodes (LEDs) 100-108 toward the front of the bezel 12 illuminating a lower side of the bill inlet for a customer to easier recognize the bill entry slot. A microprocessor driven controller located inside the bill validator will sequentially turn the LEDs 100-108 ON and OFF to create a pattern of light at the entry of the bill. If the turning ON and OFF frequency and period are optimally selected one of the two indicators is illuminated and also the upper side of the bill entry slot.

It will be understood that the $1 and $5 denominations displayed are exemplary and could replaced with other denominations or currencies, e.g. 1 Euro and 5 Euro indications.

Figure 14:
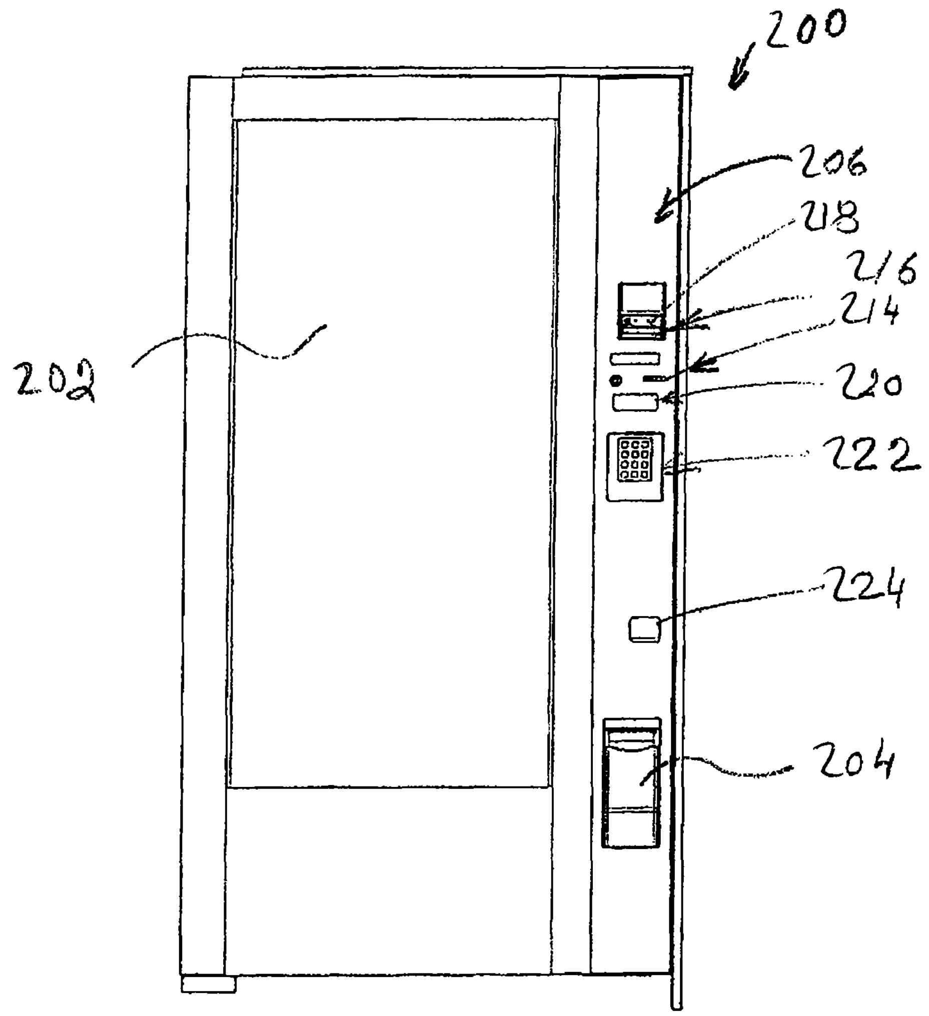
FIG. 14 is a front view of a typical soft drink vending machine according to an embodiment of the present invention.
Figure 15:
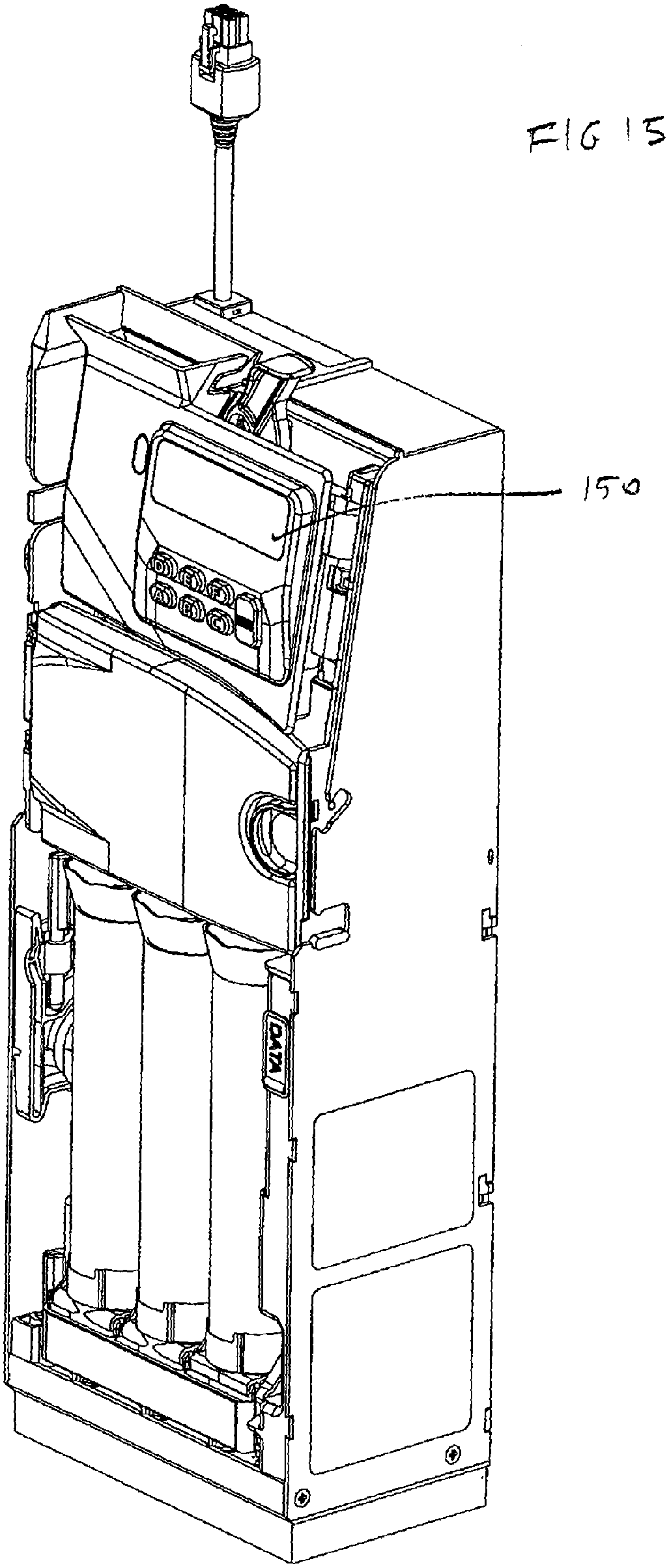
FIG. 15 is a front view of a typical coin changer with tubes according to an embodiment of the present invention.
Figure 16:
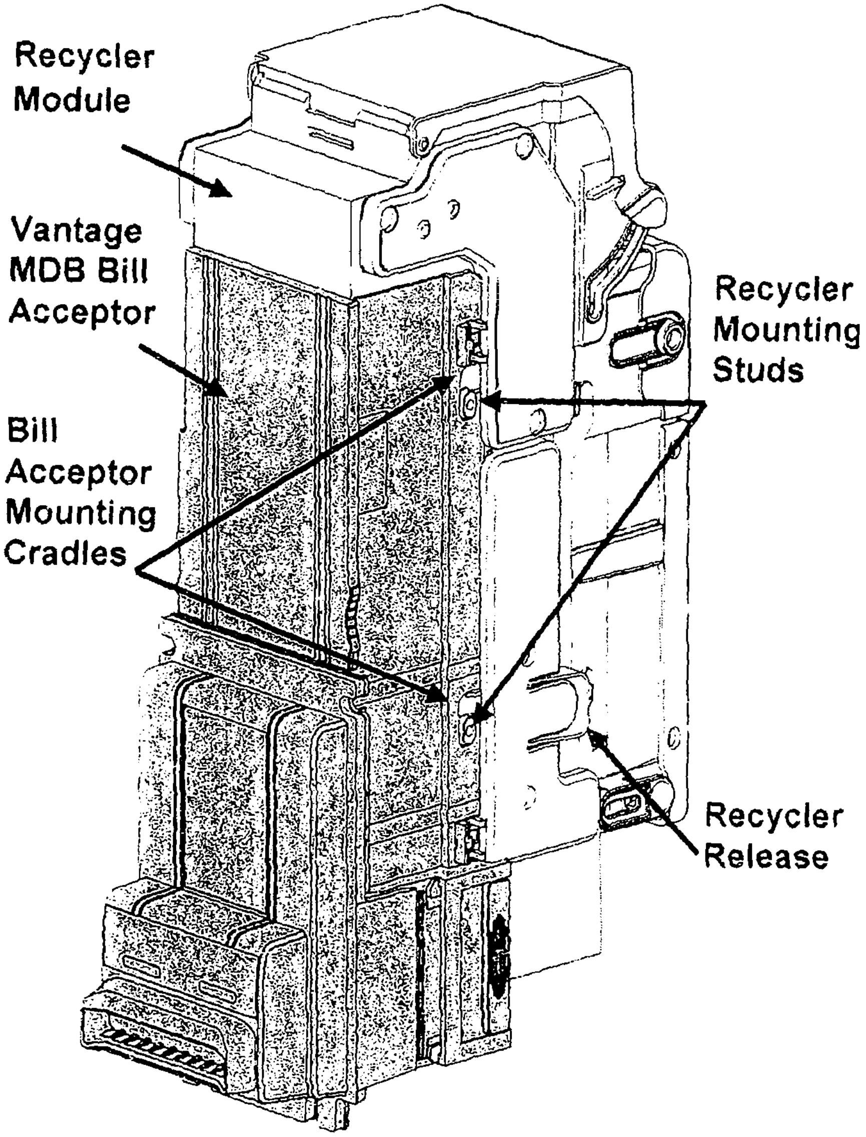
FIG. 16 is a lateral view of a typical bill validator according to an embodiment of the present invention.

Referring to FIG. 14, the front view of a typical soft drink vending machine 200 includes a large door area 202, a vend port 204 through which a selected product is dispensed. A recessed panel area 206 includes a coin entry slot 214, a bill entry slot 216, a bezel display 218, a vending machine display 220, a selection keypad 222, and a change return cup 224. Products located inside the vending machine, usually in columns or rows are visible through the window 202. When the customer makes a product selection using the keypad 222, the price of the product is displayed on the vending machine display 220. In order to purchase a product the customer has first to establish a credit equal or larger than the price of the product he wants to purchase. To do that the customer could introduce coins in the coin slot 214, bills in the bill entry slot 216, or to swipe a credit card if a credit card reader is available on the panel 206. The bills are verified by a bill validator like the one of FIG. 16. Credit information is communicated to the vending machine controller and the bills are stored in one lot the two boxes the bill validator is equipped with, the stacker or the stacker-dispenser. The coins are verified by coin changer like the one of FIG. 15, credit information is sent to the vending machine controller and the coins are deposited in the coin tubes of the coin changer or if they are full in a cash box located behind the panel 206 of the vending machine presented in FIG. 14. The vending machine controller accumulates the credit received via coins and bills and waits for the customer to make a product selection using the keypad 222. When the selection is made, the price of that selection is compared with the amount of established credit and if the credit is equal or larger the vending machine controller will activate a selection associated mechanism for product delivery to the customer via the port 204 of the FIG. 14. If the credit was larger than the price of the selected and delivered product change is returned to the customer via the coin cup 224 and or the bill slot 216 of FIG. 14. The vending machine controller located inside a vending machine like the one of FIG. 14 communicates via a serial, parallel or wireless bus with the credit accepting devices like the coin changer of FIG. 15 and the bill validator of FIG. 16 as well as with the cash and coin storage devices like the tubes of the coin changer and the cash boxes of the bill validator. The entire vending machine system works on the basis that the customer could make a selection of an available product, could create a credit equal or larger than the selection price using the accept credit devices and consequently receive the product and any amount of change if necessary. Any time that this cannot be implemented a service call is needed. This service call may be as simple as re-supplying the vending machine with product, re-supplying the coin changer with coins and the bill validator dispenser-box with bill for making change, or repairing one of the devices. Reducing the number of service calls improves the profitability of the vending machine system. Ideally the service call should be needed only when the shelves of the vending Machine are empty and the tubes and the cash boxes are full with coin and bills deposited by the customer as credit for the purchased products. One way to reduce the service calls is by improving the reliability of all the components of the vending machine system so to reduce or eliminate repair needed service calls. Ability to provide any necessary change represents another condition of a working system. Maximizing the total amount of vended products is a goal and the improvements presented here will allow for that.

When the service machine operator loads product in the vending machine they also load coins in the coin changer tubes and bills in the bill validator stacker-dispenser box. The door is locked and the vending machine is ready to operate. The amount of cash loaded depends on many factors like the minimum and maximum price of the products in the vendor, what coin and bill denomination are acceptable by the vendor, etc. The vending machine controller registers the amounts and the vending machine becomes functional. The vending machine display displays a "greeting" type message, the display on the bill validator bezel displays the type of currency accepted, e.g. $1 and $5, and customer could make credit and select product as explained above.

When the prices of the product are different than exactly $1, the tubes of the coin changer will have to be filled with an amount of coins to allow for customer usage of the $1 bill. If the usage of the $5 bill is desired, than the stacker box-dispenser will have to be filled with $1 bills. If there will be no bills in the stacker-dispenser and the customer uses $5 bill to buy a low price item, a large amount of change will have to come out from the coin tubes and eventually the acceptance of the $5 bill and $1 bill will not be possible as no change is available, resulting in lost sales revenue.

Existing vending machine systems calculate the amount of available change in tubes and cash boxes at the level of the vending machine controller and the controller will use the information to determine what coins and bills are acceptable so the machine to be able to return change on any product that the customer selects. The vending machine display displays this information. When not enough change is available the message "USE EXACT CHANGE ONLY" is displayed.

The advantage of this improved system is this: when the bill validator stacker-dispenser box is empty, the acceptance of the $5 bill can optionally be disabled locally disabled, at the bill validator level, and the customer is informed that only $1 bills are enabled using the bezel's own display, see FIG. 14 item 218. In this way the available coins in the coin tubes of the coin changer are preserved and used for giving change when the customer uses $1 bills. When $1 bills are later used by customers to purchase product, the stacker-dispenser box of the bill validator will eventually be filled to a level where the acceptance of the $5 is again allowed to be used for credit. The customer is informed about this on the same bill validator bezel display 216 of FIG. 14.

Another improvement of the system works as follows: the service machine operator loads the coins in the coin tubes at a predetermined level, for the system to have change to the $1 bill, which the customer is allowed to use. A button or another means is available at the coin changer to memorize the level of the coins in every coin tube. Any coins deposited by the customer from that point on will be directed to the coin box such that the previous level in the coin tubes is preserved. If change is needed it will be paid from the tubes, the level of coins will drop and, if later customers deposit coins, these coins will be deposited to the tubes but not beyond the pre-established level. If a bill validator with a stacker-dispenser box is available in the system, than the acceptance of the $5 bill may be optionally conditioned by the availability of the $1 bills in the dispenser and so displayed on the bill validator bezel display. In a system where the bill validator has no stacker-dispenser, the acceptance of the $5 bill will have to be controlled by the level of the coins in the changers tubes. We recall that initially coins where loaded in the tubes at a specific level that was memorized by the coin changer based on $1 bill acceptance and any newly arrived coins were dropped into the coin box rather than into the tubes. The setting will be different when the changer has to control the acceptance of the $5 bill. After the coins are loaded and the initial level memorized, if the acceptance of the $5 bill is desired the coin changer is set accordingly using a push button or other means. As the action is completed, new arrived coins will be allowed to go to the tubes above the prior memorized level, up to the other second memorized level. After this new level was reached, newer coin will be directed to the coin cash box. However, after the second memorized level of coins is reached, the $5 bill will be indicated as acceptable, and the display on the bill validator bezel will indicate this to the customer. The amount of coins between the two levels is variable and settable by the service machine operator to correspond to the coin and bill activity at the vending machine location. As soon as the level of coins in the coin tubes drops to the first memorized level, the acceptance of the $5 bill is once again prohibited and the display on the bill validator bezel displays that only the $1 bill is enabled, thereby preserving said coins for typical $1 bill purchases.

Acceptance of the $1 bill is determined by the ability to make change from the coins in the coin tubes regardless of the coin level or amount.

The service machine operator could choose the two memorized levels based on his experience on how the vending machine works at that location, e.g. what kind of coins and or bills the customer uses, products sold, peak times and low times, etc. Another way to set the levels is by using a "learning mode" of the coin changer and the bill validator. When choosing the learning mode, the operator loads the coins in the coin tubes to the maximum tube capacity and loads bills in the dispenser-box to its maximum capacity. For both the changer and the bill validator, the operator selects "learning mode" of operation using the available "push button" or equivalent means. The vending machine will accept $1, $5 and any coin in the coin set with the only condition of being able to pay change to the customer based on the credit and price of the selected product. When in operation, the system of vending machine controller, coin changer, bill validator will record all the transactions, including all the components of the transactions like coins and bills used, selection and price of the selection, time of occurrence, sequence of occurrences, etc. After a predetermined amount of time and a number of machine/operator cycles, data collection is completed and a statistical analysis will occur. Following the analysis the two coin tube levels are determined and displayed on the service display 150 of the coin changer of FIG. 15.

The above examples show that the invention, as defined by the claims, has far ranging application and should not be limited merely to the embodiments shown and described in detail. Instead the invention should be limited only to the explicit words of the claims, and the claims should not be arbitrarily limited to embodiments shown in the specification. The scope of protection is only limited by the scope of the accompanying claims, and the Examiner should examine the claims on that basis.

We claim:

1. A bill validator for a vending machine comprising:

a bill validator housing having a pair of wing deflectors slidingly attached to the bill validator;

a bezel having at least two indicator apertures in a faceplate portion thereof and further comprising a pair of opposing mounting wings that extend outwardly from a body of the bezel in the direction of the bill validator, the mounting wings comprising retainer portions, the retainer portions comprising ramped surfaces and retainer surfaces on inner surfaces of the wings;

wherein the retainer portions cooperate with bezel mount apertures formed in the bill validator housing to retain the bezel upon the bill validator housing;

wherein the wing deflectors comprise tapered surfaces at an end adjacent to the mounting wings, the tapered surfaces of the wing deflectors, when brought into contact with the mounting wings, resiliently force the mounting wings of the bezel outwardly away from one another to disengage the retainer portions from the bezel mount apertures to allow disassociation of the bezel from the bill validator housing.

2. The bill validator of claim 1 wherein the bezel defines a bill acceptance aperture.

3. The bill validator of claim 1 wherein a translucent material is mounted within the indicator apertures.

4. The bill validator of claim 1 wherein the bill validator housing comprises a plurality of light sources which illuminate corresponding indicator apertures to indicate to a consumer the denominations of bills accepted by the bill validator.

5. The bill validator of claim 1 wherein the bill acceptance aperture comprises a bill acceptance projection having an aperture therein for accepting bills.

6. The bill validator of claim 5 wherein the bill acceptance aperture comprises a translucent material.

7. The bill validator of claim 6 wherein the bill validator body comprises light sources that illuminate the translucent bill acceptance projection.

8. The bill validator of claim 7 wherein the light sources further provide illumination to corresponding indicator apertures to indicate to a consumer the denominations of bills accepted by the bill validator.

9. The bill validator of claim 1 wherein the bill validator includes a processor for determining whether to illuminate an indicator aperture when a vending machine in which the bill validator is installed when the bill validator determines that insufficient change exists within the bill validator or a coin acceptor installed within the vending machine.

10. The bill validator of claim 9 wherein the processor for determining whether to illuminate an indicator aperture removes illumination from the aperture when the number of coins in the coin change falls below a configurable number of coins.

11. The bill validator of claim 9 wherein the processor for determining whether to illuminate an indicator aperture removes illumination from the aperture when the number of bills in the bill validator falls below a configurable number of bills.

12. A bill validator comprising:

a bill validator housing having a pair of wing deflectors attached thereto in a sliding arrangement;

wherein the wing deflectors comprise tapered surfaces at an end adjacent to mounting wings of a bezel when the bezel is installed on the bill validator housing, the tapered surfaces when brought into contact with the mounting wings resiliently force the mounting wings outwardly to disengage retainer portions of the mounting wings from bezel mount apertures of the bill validator to allow disassociation of the bill validator housing from the bezel.

13. The bill validator of claim 12 wherein the bezel defines a bill acceptance aperture.

14. The bill validator of claim 12 wherein a translucent material is mounted within the indicator apertures.

15. The bill validator of claim 12 wherein the bill validator housing comprises a plurality of light sources which illuminate corresponding indicator apertures to indicate to a consumer each bill denomination or group of denominations accepted by the bill validator.

16. The bill validator of claim 12 wherein the bill acceptance aperture comprises a bill acceptance projection having an aperture therein for accepting bills.

17. The bill validator of claim 16 wherein the bill acceptance aperture comprises a translucent material.

18. The bill validator of claim 17 wherein the bill validator comprises light sources that illuminate the translucent bill acceptance projection.

* * * * *